United States Patent
Winkler et al.

(10) Patent No.: US 8,616,348 B2
(45) Date of Patent: Dec. 31, 2013

(54) COMBINED VEHICLE BRAKE WITH ELECTROMECHANICALLY OPERABLE PARKING BRAKE AND GEAR FOR CONVERTING A ROTARY MOVEMENT INTO A TRANSLATIONAL MOVEMENT

(75) Inventors: Thomas Winkler, Mainz (DE); Jürgen Balz, Hünstetten-oberlibbach (DE); Dirk Koch, Lollar-odenhausen (DE); Marcus Schumann, Edingen-Neckarhausen (DE); Anja Klimt, Frankfurt am Main (DE); Jürgen Bauer, Wiesbaden (DE); Torsten Hintz, Karben (DE)

(73) Assignee: Continental Teves AG & Co. oHG (DE)

( * ) Notice: Subject to any disclaimer, the term of this patent is extended or adjusted under 35 U.S.C. 154(b) by 596 days.

(21) Appl. No.: 12/441,809

(22) PCT Filed: Sep. 26, 2007

(86) PCT No.: PCT/EP2007/060213
§ 371 (c)(1),
(2), (4) Date: Mar. 18, 2009

(87) PCT Pub. No.: WO2008/037738
PCT Pub. Date: Apr. 3, 2008

(65) Prior Publication Data
US 2009/0283371 A1    Nov. 19, 2009

(30) Foreign Application Priority Data

Sep. 27, 2006 (DE) .......................... 10 2006 045 999
Jan. 11, 2007 (DE) .......................... 10 2007 002 446
Apr. 12, 2007 (DE) .......................... 10 2007 017 210
Aug. 1, 2007 (DE) .......................... 10 2007 036 460
Sep. 26, 2007 (DE) .......................... 10 2007 046 180

(51) Int. Cl.
*F16D 55/08* (2006.01)

(52) U.S. Cl.
USPC ....................................... 188/72.8; 188/196 V

(58) Field of Classification Search
USPC ................. 188/72.8, 196 V, 72.7, 202, 196 F
See application file for complete search history.

(56) References Cited

U.S. PATENT DOCUMENTS

| 3,498,421 | A | * | 3/1970 | Ohmayer ........................ 188/370 |
| 4,850,457 | A | | 7/1989 | Taig |
| 5,107,967 | A | * | 4/1992 | Fujita et al. ................... 188/72.1 |
| 5,348,123 | A | * | 9/1994 | Takahashi et al. ............ 188/72.1 |
| 6,142,265 | A | * | 11/2000 | Reimann et al. .............. 188/158 |

(Continued)

FOREIGN PATENT DOCUMENTS

| DE | 2416952 A | * | 10/1975 |
| DE | 76 40 810 | | 7/1977 |

(Continued)

*Primary Examiner* — Xuan Lan Nguyen
(74) *Attorney, Agent, or Firm* — RatnerPrestia

(57) ABSTRACT

A combined vehicle brake including a hydraulically actuated service brake and an electromechanically actuated parking brake device, a hydraulic operating pressure chamber in a brake housing being defined by a brake piston, which for performing service braking actions can be acted upon by hydraulic pressure fluid, so that the brake piston can be actuated along a piston longitudinal axis in order to produce a braking action, and the parking brake device acting on the brake piston by way of a transmission that translates the rotary motion of an electromechanical actuator into a translational motion and actuates the brake piston to perform parking brake actions and to keep it in the actuated position. Also disclosed is a transmission for translating a rotary motion into a translational motion by way of a screw spindle and a spindle nut, which are in contact with one another by way of multiple rolling elements.

19 Claims, 12 Drawing Sheets

(56) References Cited

U.S. PATENT DOCUMENTS 6,349,801 B1 * 2/2002 Koth et al. .................. 188/72.8
6,422,354 B1 * 7/2002 Shaw et al. .................. 188/72.8

FOREIGN PATENT DOCUMENTS

| | | | |
|---|---|---|---|
| DE | 94 20 384 | | 4/1995 |
| DE | 198 53 721 A1 | | 6/1999 |
| DE | 101 50 803 | | 5/2003 |
| DE | 10 2004 039 846 A1 | | 3/2005 |
| DE | 102004038951 | | 2/2006 |
| EP | 0866236 A1 | * | 9/1998 .............. F16D 65/14 |
| FR | 2 337 285 | | 7/1977 |
| FR | 2337285 | * | 9/1977 |
| GB | 2406153 | | 3/2005 |

* cited by examiner

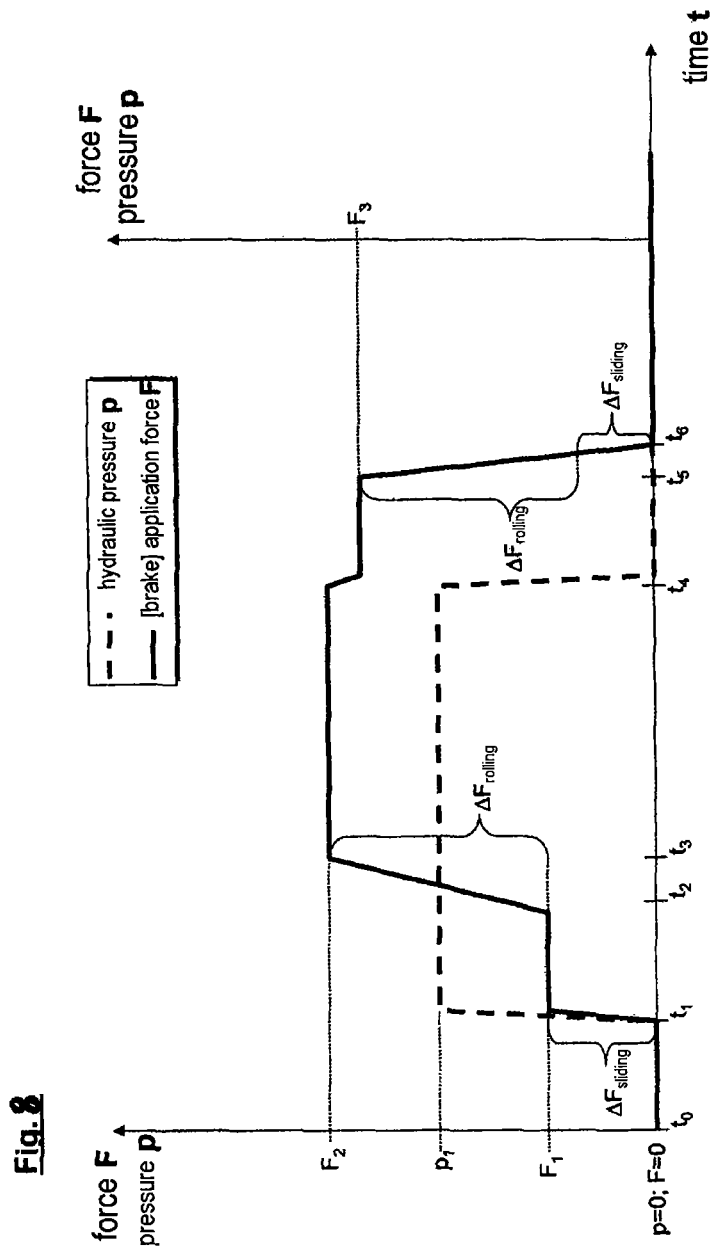

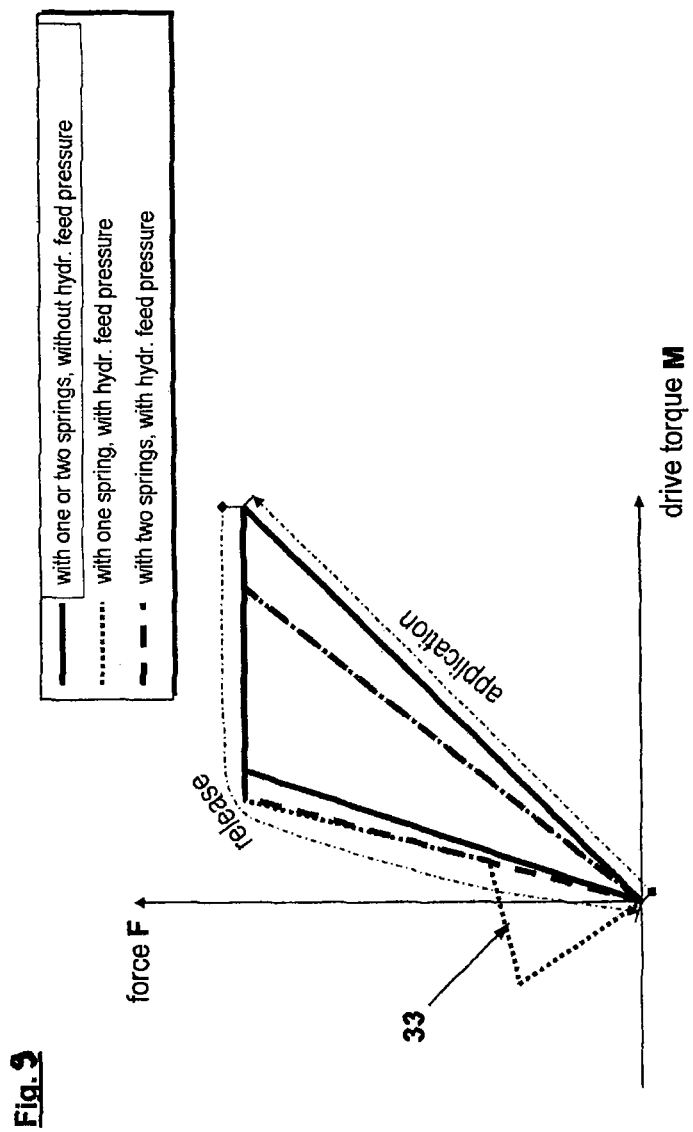

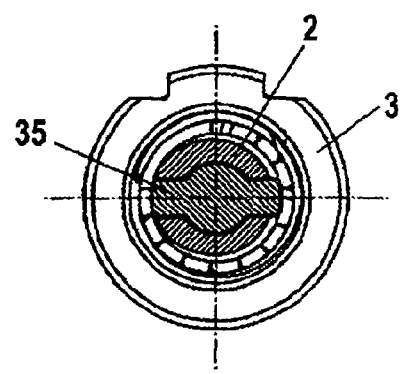 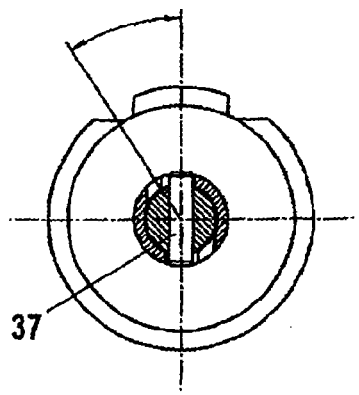
Fig. 11a
D - D
Fig. 11b
E - E
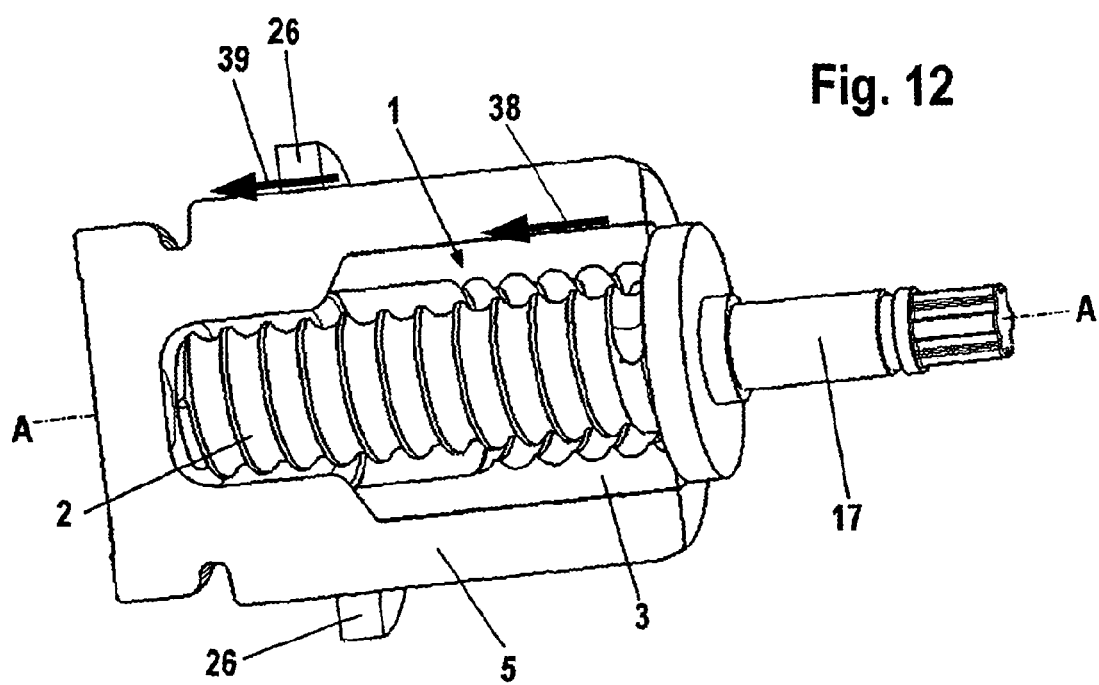
Fig. 12

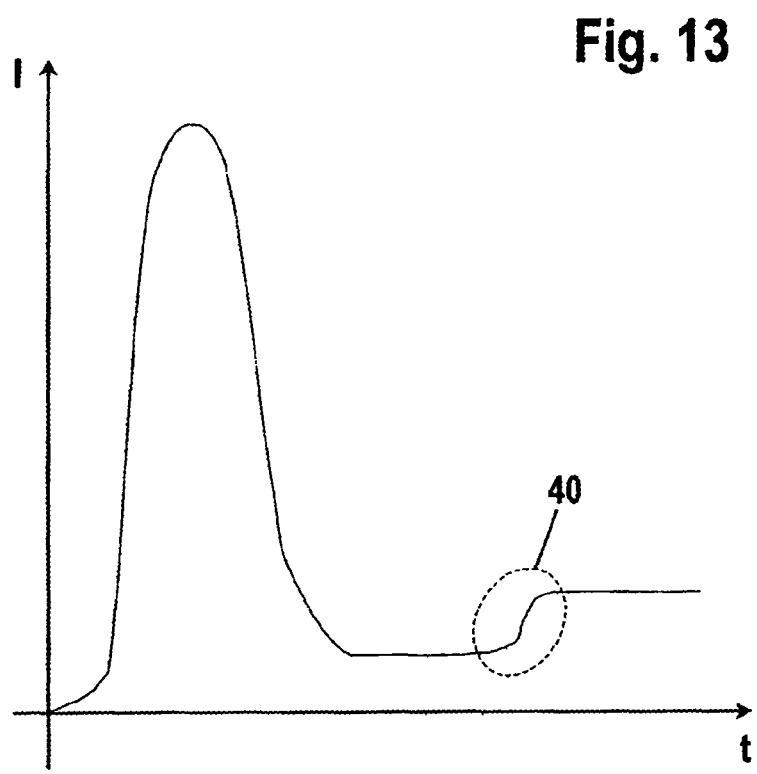

COMBINED VEHICLE BRAKE WITH ELECTROMECHANICALLY OPERABLE PARKING BRAKE AND GEAR FOR CONVERTING A ROTARY MOVEMENT INTO A TRANSLATIONAL MOVEMENT

CROSS REFERENCE TO RELATED APPLICATIONS

This application is the U.S. national phase application of PCT International Application No. PCT/EP2007/060213, filed Sep. 26, 2007, which claims priority to German Patent Application No. DE102006045999.7, filed Sep. 27, 2006, German Patent Application No. DE102007002446.2, filed Jan. 11, 2007, German Patent Application No. DE102007017210.0, filed Apr. 12, 2007, German Patent Application No. DE102007036460.3, filed Aug. 1, 2007, and German Patent Application No. DE102007046180.3, filed Sep. 26, 2007, the contents of such applications being incorporated by reference herein.

BACKGROUND OF THE INVENTION

1. Field of the Invention

The present invention relates to a combined vehicle brake, which comprises a hydraulically actuated service brake and an electromechanically actuated parking brake device a hydraulic operating pressure chamber in a brake housing being defined by a brake piston, which for performing service braking actions can be acted upon by hydraulic pressure fluid, so that the brake piston can be actuated along a piston longitudinal axis in order to produce a braking action, and the parking brake device acting on the brake piston by means of a transmission, in that the transmission translates the rotary motion of an electromechanical actuator into a translational motion and actuates the brake piston in order to perform parking brake actions and keeps it in the actuated position, the transmission comprising a screw spindle and a spindle nut, which are in contact with one another by way of multiple rolling elements. The present invention also relates to a transmission for translating a rotary motion into a translational motion by means of a screw spindle and a spindle nut, which are in contact with one another by way of multiple rolling elements.

2. Description of the Related Art

A hydraulic vehicle brake with electrically actuated parking brake device is disclosed, for example, by DE 101 50 803 B4. In the known vehicle brake a transmission is provided, which on the operating principle of a spindle nut/screw spindle arrangement translates the rotary motion of the electric motor into a longitudinal motion of the brake piston in order to produce a holding force. According to one exemplary embodiment this transmission unit is embodied as a so-called 'spindle/recirculating ball sleeve arrangement', which is also referred to as a ball screw mechanism or recirculating ball screw. These ball screw mechanisms have a screw spindle and a spindle nut, which are in contact with one another by way of multiple rolling elements. For returning the rolling elements in the form of balls, a ball channel is always provided, as is disclosed, for example, in DE 10 2004 038 951 A1. This ball channel is costly to produce, which therefore makes a ball screw mechanism of prior art relatively expensive to manufacture.

SUMMARY OF THE INVENTION

An object of the present invention therefore is to improve a combined vehicle brake of the generic type specified in the introduction in such a way that the transmission of the electromechanically actuated parking brake is cost-effective to manufacture and at the same time has a high efficiency, in order to reduce the electrical power consumption for performing parking brake actions. A further object of the present invention is to describe such a transmission.

According to aspects of the invention, the rolling elements are here arranged so that they can move to a limited extent between two stops in the thread, a spring element being arranged between the rolling elements and a stop and allowing the rolling elements to slide in no-load actuation of the transmission and allowing the rolling elements to roll when the transmission is actuated under load. This measure obviates the need to return the rolling elements or the balls, since the spring element maintains a 'buffer travel' ahead of the rolling elements, allowing them to roll. In no-load actuation the rolling elements slide. In the event of brake lining wear, an adjustment can therefore be performed. In other words, the present invention combines an adjusting device and an actuating device in one single component, which is made up of comparatively few parts. At the same time the overall efficiency is comparatively high, which results in a reduced electrical power consumption and short parking brake activation and deactivation times.

In an especially advantageous development of the subject of the invention a second spring is provided, which is arranged between the rolling elements and the other stop. The second spring element serves as buffer when releasing the parking brake. This buffer comes into play if a high hydraulic brake pressure has been built up in the hydraulic service brake prior to actuation of the parking brake. In this case the rolling distance of the balls when releasing is greater than when actuating the brake, for which reason a second 'buffer travel' in the opposite direction is advantageous.

In one advantageous embodiment the stops are frictionally coupled to the spindle nut or are integrally formed with the spindle nut.

The stops are formed by pins, which are braced against the spindle nut. Here the pins are pressed into bores in the spindle nut and project into the thread of the spindle nut.

In an alternative embodiment the stops are formed by two helical segment-shaped locking elements, the diameter of which before fitting is greater than the diameter of the thread. After fitting, the helical segment-shaped locking elements are frictionally positioned in the spindle nut due to an elastic deformation.

In an especially preferred embodiment of the subject of the invention a mechanical energy storage device is provided, which can be loaded during actuation of the screw spindle. The mechanical energy storage device here takes the form of a torsion bar, which is received by an axial bore in the screw spindle and is positively connected or frictionally coupled to the screw spindle at an end of the screw spindle remote from the drive. The cross section of the torsion bar is circular or rectangular.

In an especially advantageous development of the invention a flange of the screw spindle is received by a stepped bore in the brake housing and is supported by a first axial bearing on the brake housing, whilst a second axial bearing is arranged between the flange and a canister connected to the brake housing and suppresses any movement of the screw spindle along the longitudinal axis of the piston. The canister is here advantageously pressed into the stepped bore in the brake housing and forms a stop for the spindle nut.

In a further advantageous development of the subject of the invention a two-stage reduction gear is interposed between the electromechanical actuator and the screw spindle, one stage of the reduction gear being of self-locking design.

In an advantageous development of the subject of the invention the spindle nut is pressed into the brake piston in such a way that a relative movement between the spindle nut and the brake piston generates a frictional force. Alternatively or in addition, a sealing ring is provided between the brake piston and the brake housing and generates a frictional force in the event of a relative movement between the brake piston and the brake housing.

The rolling elements are here arranged so that they can move to a limited extent between two stops in the thread, a spring element being arranged between the rolling elements and a stop and allowing the rolling elements to slide in no-load actuation of the transmission and allowing the rolling elements to roll when the transmission is actuated under load. This measure maintains a rolling travel, allowing the rolling elements to roll and therefore obviates the need to return the rolling elements.

These and other aspects of the invention are illustrated in detail by way of the embodiments and are described with respect to the embodiments in the following, making reference to the Figures.

BRIEF DESCRIPTION OF THE DRAWINGS

Aspects of the invention will be explained in more detail below with reference to two exemplary embodiments in conjunction with the drawing attached, in which:

FIG. 8 shows a time lapse diagram for application and release of the parking brake;

FIG. 9 shows a diagram comparing the brake application force and the drive torque of the electromechanical actuator when applying and releasing the parking brake;

FIG. 11a, b show cross sections along the plane of section represented in FIG. 9b;

FIG. 12 shows a transmission according to FIGS. 3 and 4, which is fitted into a brake piston and FIG. 13 shows a time diagram of the power consumption of the electromechanical actuator when releasing the parking brake.

DETAILED DESCRIPTION OF THE PREFERRED EMBODIMENTS

Figure 1:
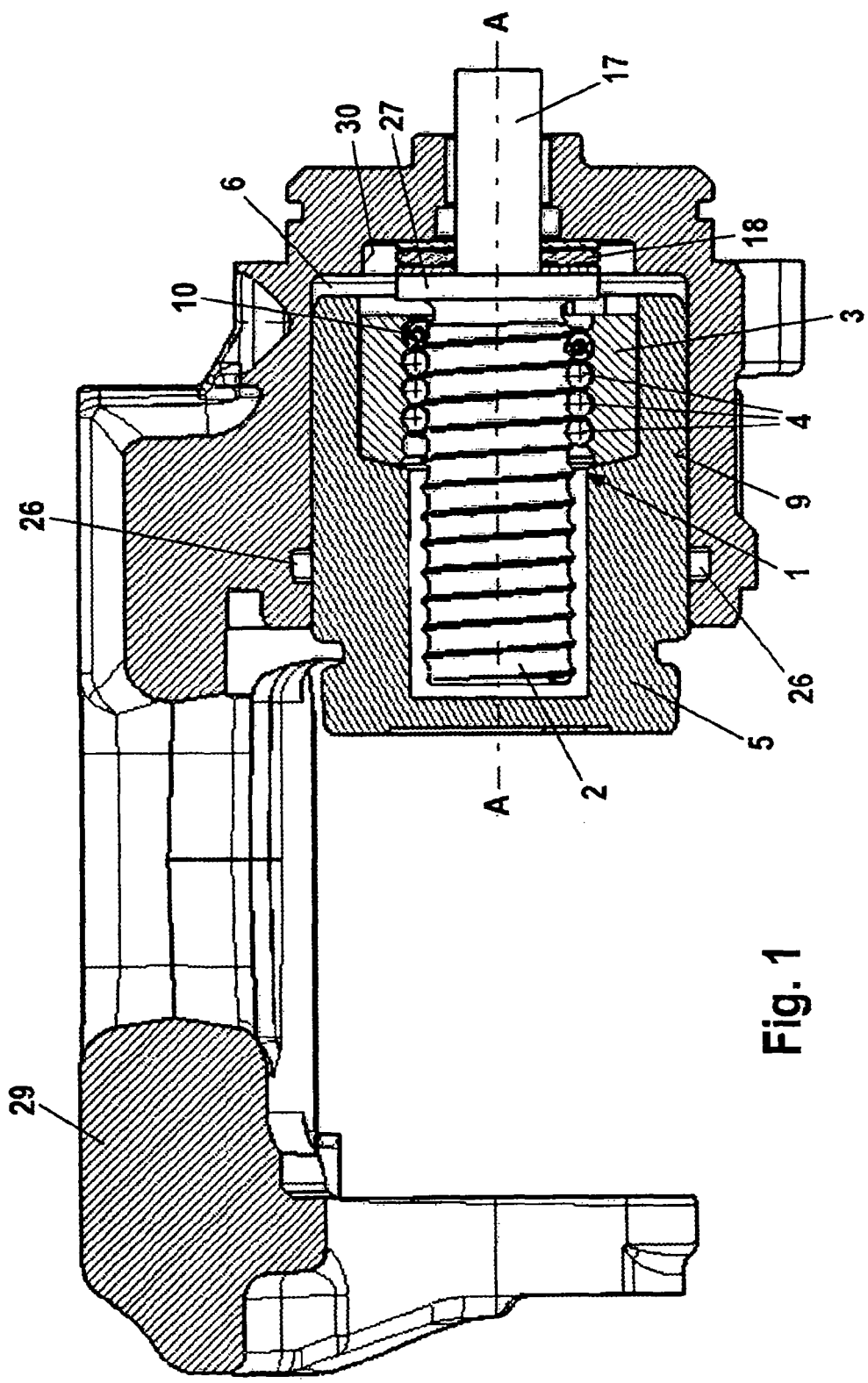
FIG. 1 shows a sectional representation of the vehicle brake according to aspects of the invention with hydraulically actuated service brake and electromechanically actuated parking brake.

The vehicle brake according to aspects of the invention represented in FIG. 1 comprises a hydraulically actuated service brake on the one hand and an electromechanically actuated parking brake device on the other. The vehicle brake comprises a brake housing 29, which encloses the outer edge of a brake disk (not shown) and two brake linings (likewise not shown). On its inside, the brake housing 29 forms a brake cylinder 9, which accommodates an axially displaceable brake piston 5. For performing service brake actions, brake fluid can be fed into the operating pressure chamber 6 formed between the brake cylinder 9 and the brake piston 5, so that a brake pressure accumulates, which displaces the brake piston 5 axially along a piston longitudinal axis A towards the brake disk. The brake lining facing the brake piston 5 is thereby pressed against the brake disk, the brake housing 29 in reaction being displaced in the opposite direction and thereby also pressing the other brake lining against the brake disk.

A parking brake device for performing parking brake actions is electromechanically actuated and likewise acts on the brake piston 5. For this purpose a transmission 1 is provided, which translates the rotary motion of an electromechanical actuator 7 into a translational motion and actuates the brake piston 5 along the axis A. The transmission 1 is substantially formed by a screw spindle 2 and a spindle nut 3, which are connected to one another by way of rolling elements 4. The rolling elements 4 are embodied as balls 4. A shaft 17 connected to the screw spindle 2 projects out of the brake housing 29 on the side remote from the brake disk and is driven by an electromechanical actuator 7 by way of a two-stage reduction gear, as will be explained in more detail below with reference to FIG. 2. The rotary motion transmitted to the screw spindle 2 is transmitted via the balls 4, situated in the thread between the screw spindle 2 and the spindle nut 3, to the spindle nut 3, which performs a translational motion in the direction of the axis A. This also actuates the brake piston 5, on which the screw nut 3 is supported. At the same time the screw spindle 2 is supported on the brake housing 29 by way of flange 27 connected to the spindle 2 and a first axial bearing 18. The transmission 1 therefore translates the rotary motion of the electromechanical actuator 7 into a linear motion and is responsible for generating the brake application force for performing the parking brake action.

In actuation of the transmission 1 under load, the rolling elements 4 roll in the thread. A relatively high efficiency of 75% to 90% is thereby achieved. In no-load actuation of the transmission 1, on the other hand, the rolling elements 4 slide, that is to say, until the brake lining assigned to the brake piston 5 bears against the brake disk (not shown), the balls 4 slide because this represents an actuation virtually free of any load. Only under load do the balls 4 begin to roll. The transmission 1 therefore simultaneously acts as an adjuster if the brake linings (not shown) are worn. Dispensing with a separate adjusting device or integrating an adjusting device and an actuating device into one single component is particularly cost-effective and at the same time robust. In order to ensure that the rolling elements 4 can always roll under load and that they slide in no-load actuation of the transmission 1, a spring element 10 is provided, which maintains some rolling travel ahead the rolling elements, allowing them to roll, as will be explained in more detail below with reference to FIG. 3.

Figure 2:
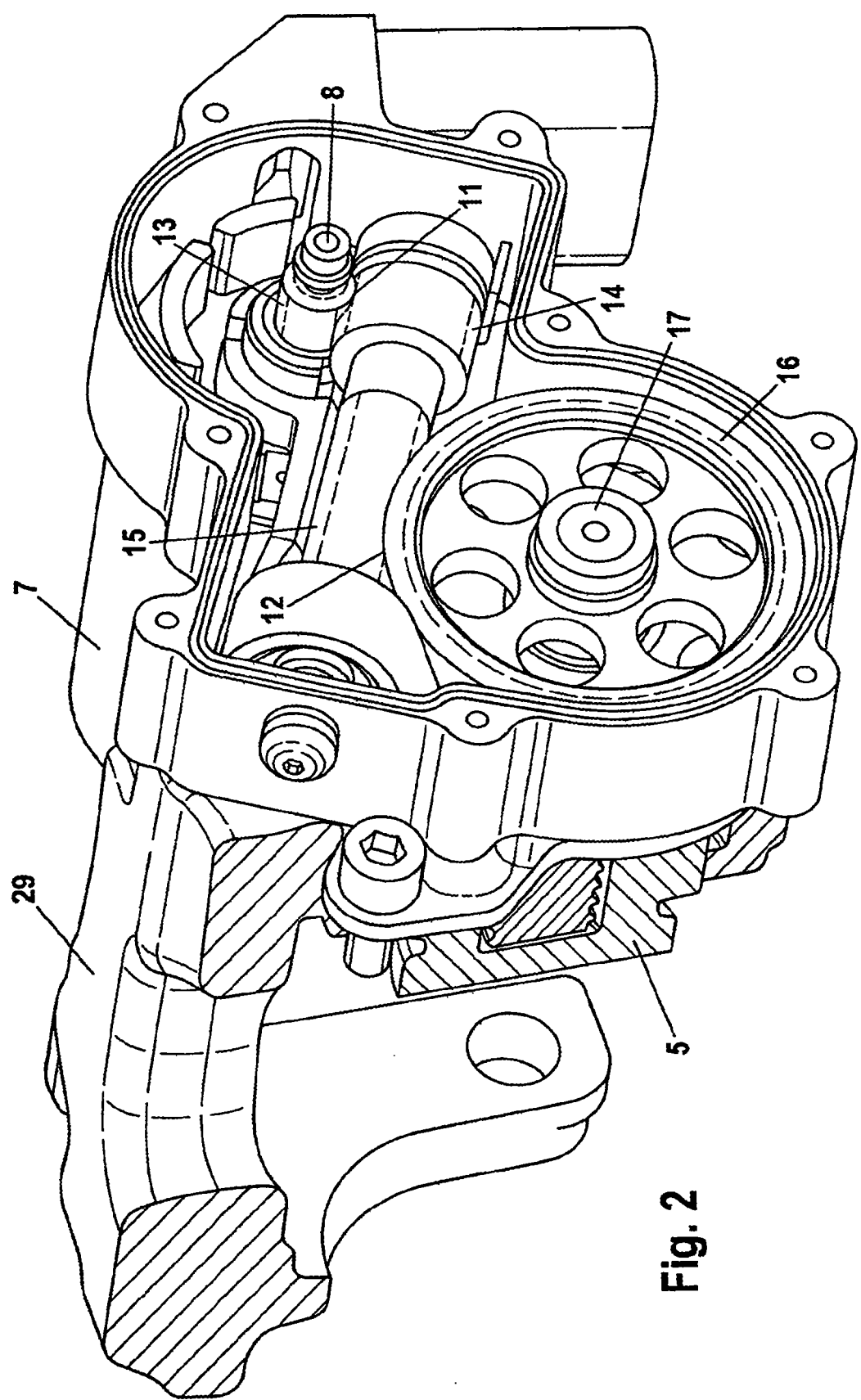
FIG. 2 shows a three-dimensional view of the vehicle brake represented in FIG. 1.

A three-dimensional view of the vehicle brake according to aspects of the invention is shown in FIG. 2. As can be seen, a two-stage reduction gear is interposed between the electromechanical actuator 7. In the embodiment represented in FIG. 2 the two-stage gear is embodied as a two-stage worm gear 11, 12. Worm gears are a type of rolling-contact screw mechanism, in which, in contrast to rolling-contact mechanisms, there is also a sliding element in the motion. Such a worm gear is made up of a helically toothed wheel, the worm, and a skew-toothed wheel, the worm wheel, meshing therein. The first gear stage, that is to say the first worm gear 11, is connected on the input side to the output shaft 8 of the electromechanical actuator 7, whilst the second gear stage, that is to say the second worm gear 12, is connected on the output side to the shaft 17 or the transmission 1. As is shown in FIG. 2, a first worm 13 is pushed onto output shaft 8 of the electromechanical actuator 7 and meshes with a first worm wheel 14. A second worm 15 is pushed onto the center of rotation of the first worm wheel 14 and is set in rotation by the latter. This second worm 15 in turn meshes with a second worm wheel 16, which is rotationally locked to the shaft 17 and sets the shaft 17 rotating together with the screw spindle 2, thereby generating a translational motion of the spindle nut 3, as has already been described. In order for the brake application force applied in this way to be maintained during a parking brake action, one worm gear must be of self-locking design. In this embodiment the first worm gear 11 has an efficiency of 75%, whilst the second worm gear with an efficiency of 40% is self-locking. The aggregate efficiency is therefore 30%. The overall reduction of the two-stage reduction gear 11, 12 combined with the transmission 1 for actuation of the brake piston 5 is in the order of 350:1. At the same time this affords a vehicle brake of short overall axial length.

Figure 3:
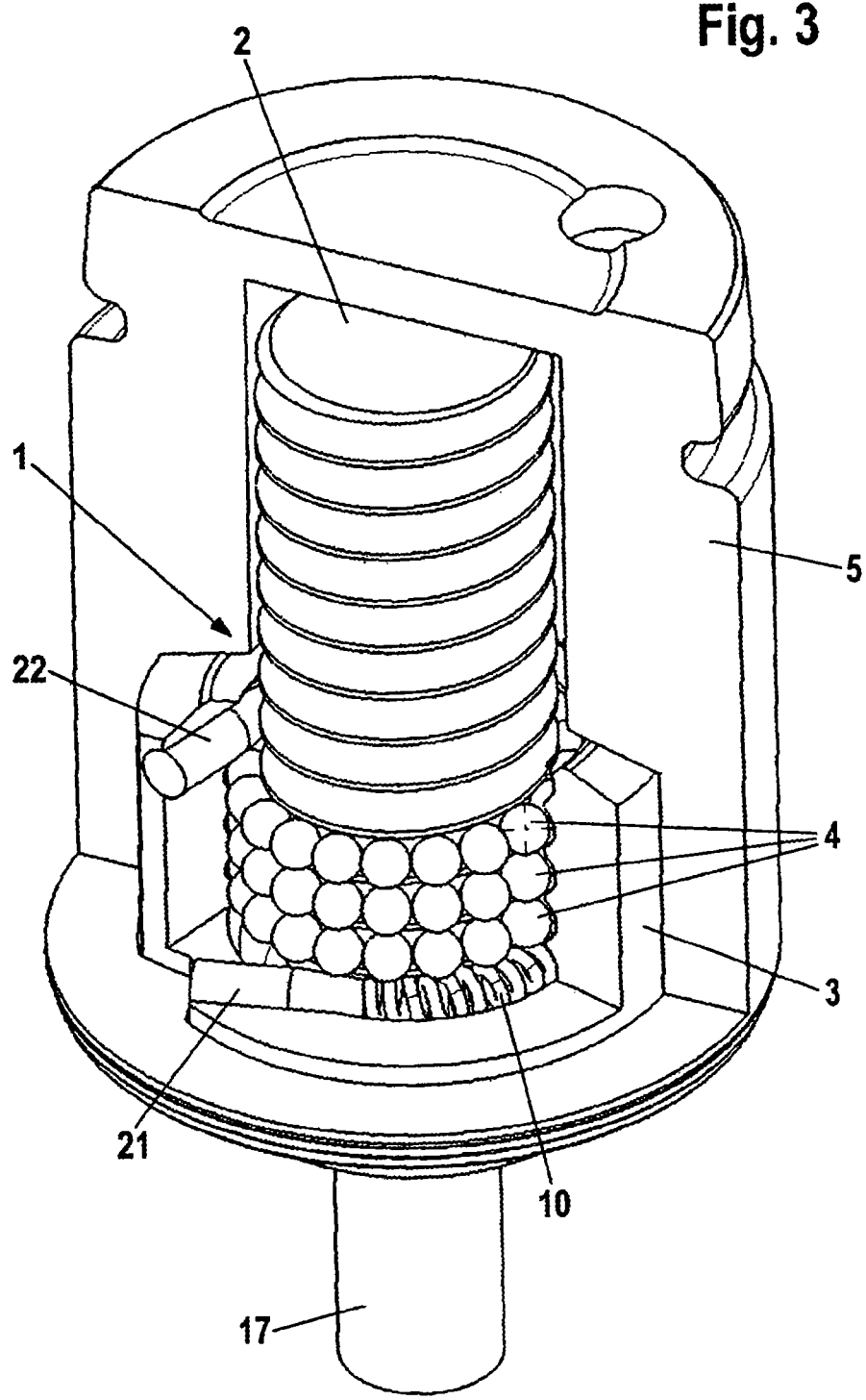
FIG. 3 shows a first embodiment of the transmission according to aspects of the invention, which can be used in a vehicle brake according to FIGS. 1 and 2 and has integral stops for the spring element.

FIG. 3 represents a first embodiment of the transmission 1. FIG. 3 shows that the balls 4 are arranged so that they can move to a limited extent between two stops 21, 22 in the thread between the screw spindle 2 and the screw nut 3. A spring element 10, which allows the balls 4 to slide in no-load actuation of the transmission 1 and allows the balls 4 to roll when the transmission 1 is actuated under load, is arranged between the first stop 21 and the balls 4, the spring element 10 acting as buffer and maintaining some rolling travel ahead of the balls. The stops 21, 22 are frictionally coupled to the spindle nut. Alternatively they may be integrally formed with the spindle nut.

Figure 4:
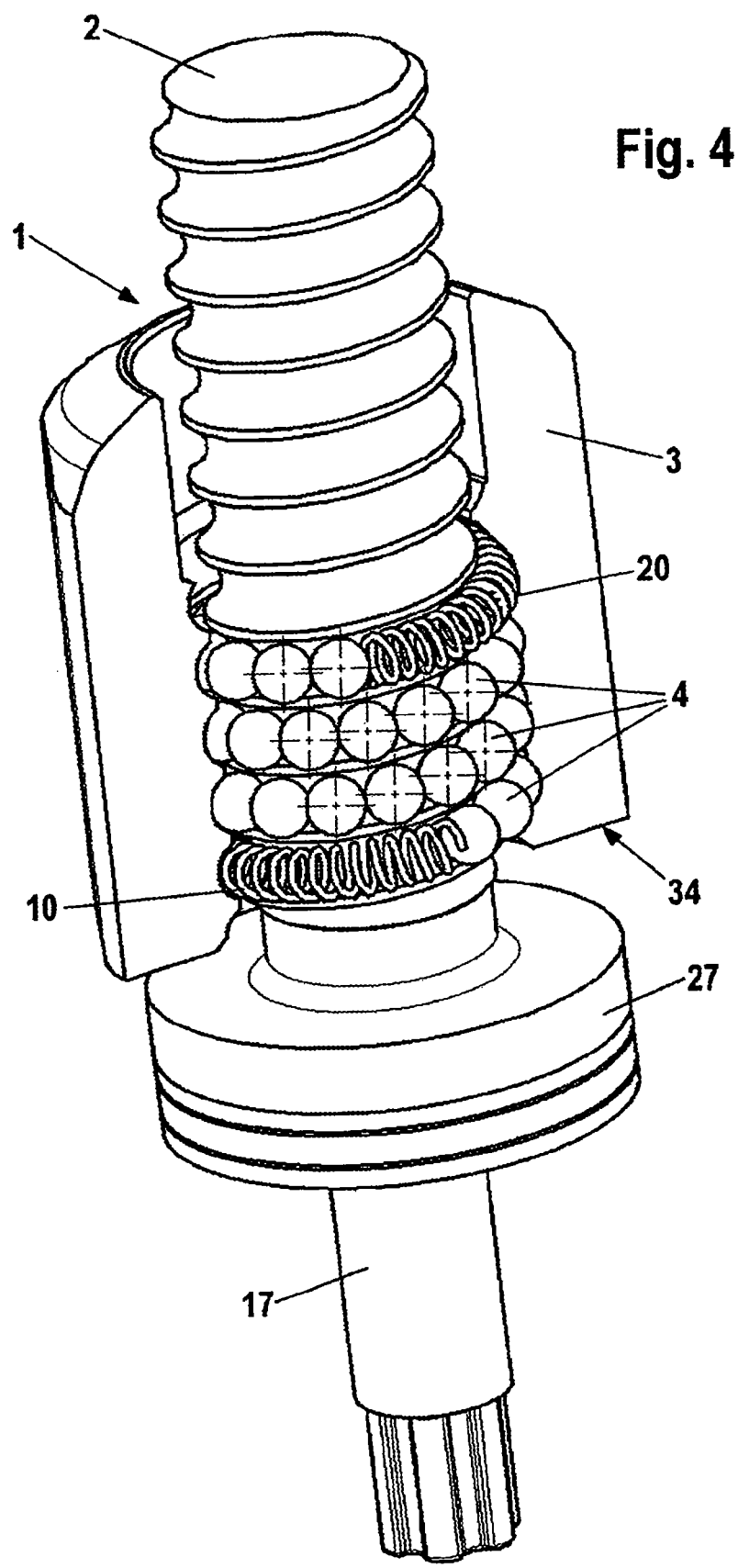
FIG. 4 shows a second embodiment of the transmission according to aspects of the invention.

The second embodiment of the transmission 1 shown in FIG. 4 has a second spring 20, which is arranged between the second stop 22, not shown here, and the rolling elements 4. This additional second spring 20 serves as buffer when releasing the parking brake. This second spring element 20 comes into play if a high hydraulic brake pressure has been admitted into the operating pressure chamber 6 prior to actuation of the parking brake. In this case the rolling distance of the balls 4 when releasing the parking brake is greater than when actuating the parking brake and the second spring element 20 maintains a rolling travel ahead of the balls 4 as a buffer.

Both of the embodiments represented in FIGS. 3 and 4 have a screw spindle 2, the lead of which is between 3 mm and 5 mm per revolution. The spindle nut 3 preferably has 2 to 5 thread turns.

Figure 5A:
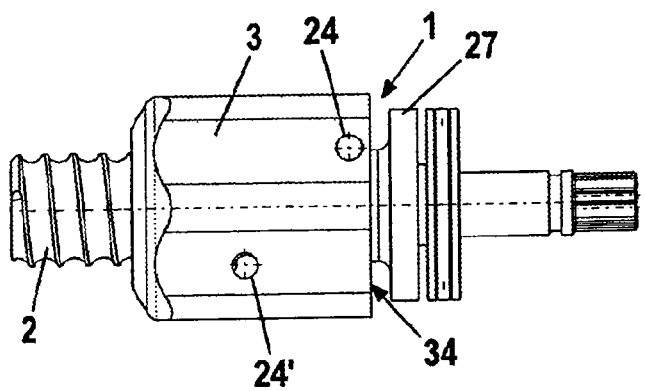
FIGS. 5a to d show various partial representations of the transmission according to FIG. 3 with a further embodiment of the stops for the spring element.
Figure 5B:
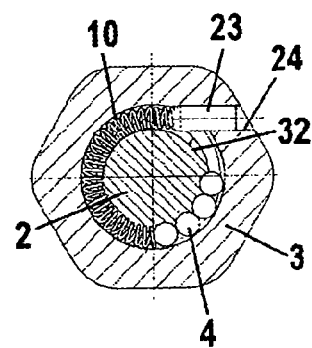
Figure 5C:
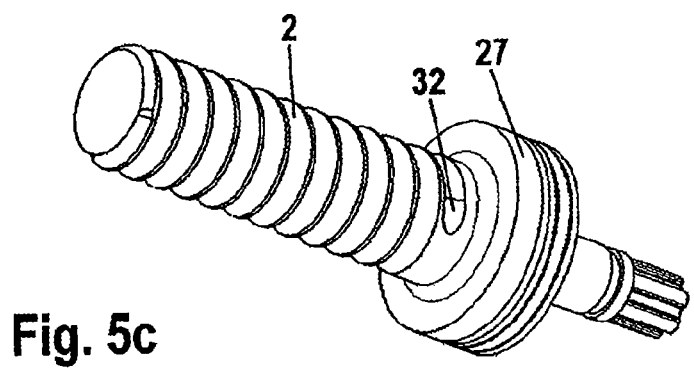
Figure 5D:
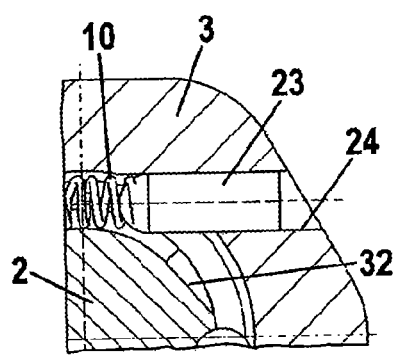

FIGS. 5a to 5d show an exemplary embodiment of the stops 21, 22 in FIGS. 3 and 4. As the two sectional representations in FIGS. 5b and 5d illustrate, the stops 21, 22 are formed by pins 23, which are pressed into bores 24, 24' in the spindle nut 3. These bores 24, 24' in the spindle nut 3 each end in a thread of the spindle nut 3 and the pins 23, pressed into the bores 24, 24', project into the thread between the spindle nut 3 and the spindle 2. As shown in FIGS. 5b and 5d in particular, the first spring element 10 is braced against the pin 23 and is arranged between the balls 4 and the pin 23 forming the stop 21. The same obviously also applies to the second stop 22 and where applicable to the second spring element 20.

As FIGS. 5b and 5c show, the pins 23 act not only as stops 21, 22 for the spring elements 10, 20 and the balls 4, but at the same time as limits to the linear motion of the spindle nut 3 on the spindle 2. The thread in the spindle 2 has a run-out face 32 in the direction of the flange 27, the run-out face interacting with the pin 23. The run-out face 32 is a continuous reduction of the groove forming the thread. This means that the space required by the pin 23 projecting into the thread is absent and the pin 23 strikes against the run-out face 32. The pin 23, the run-out face 32 and the flange 27 of the screw spindle 2 are here positioned in relation to one another so that the flange 27 of the screw spindle 2 does not come into contact with the external face 34 of the spindle nut 3. This measure prevents the spindle nut 3 from jamming against the flange 27 or the spindle 2. A second run-out face at the other end of the screw spindle 2, that is to say at the end of the screw spindle 2 remote from the flange 27, is also provided but is not represented in FIGS. 5a to 5d.

Figure 6:
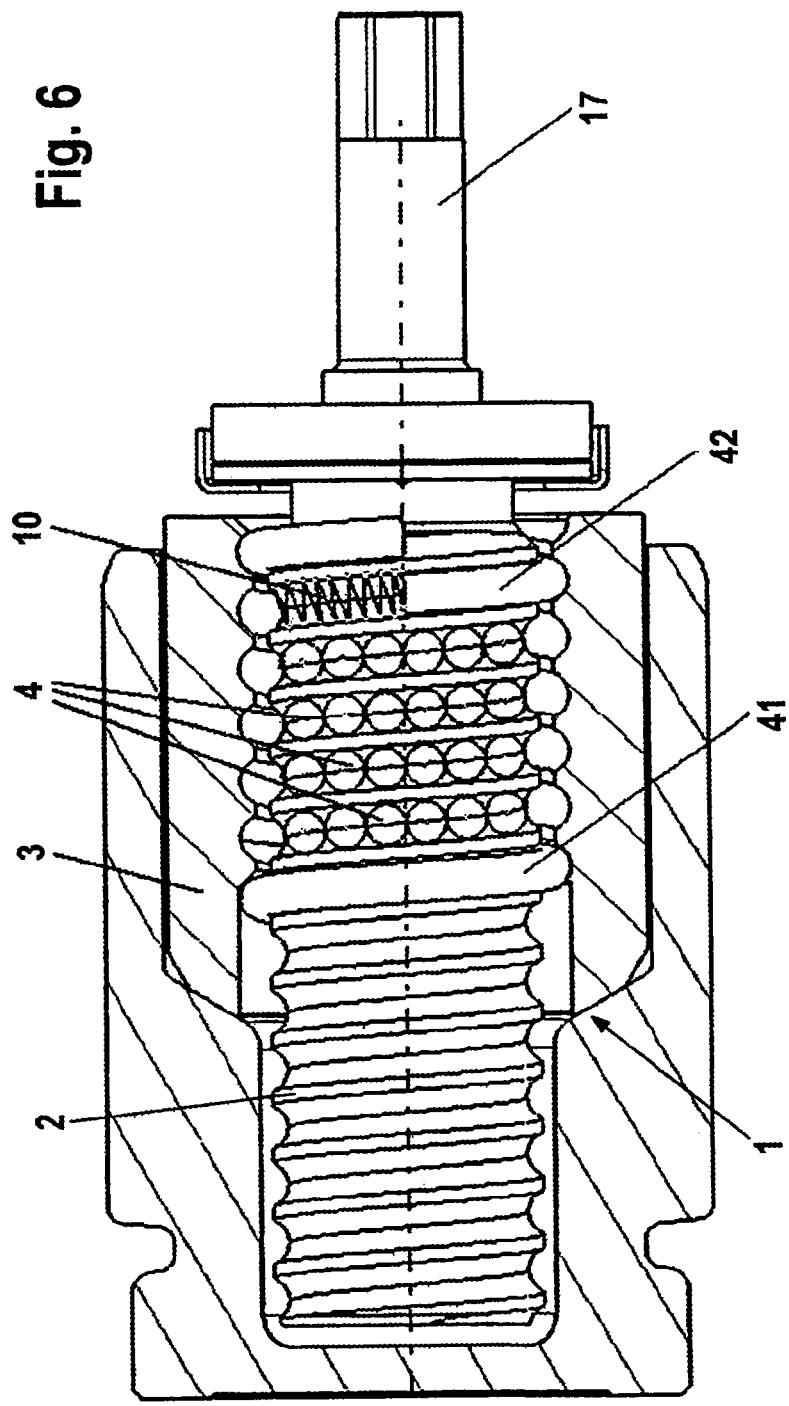
FIG. 6 shows a sectional representation with an alternative embodiment of the stops for the spring element.

In the alternative embodiment represented in FIG. 6 the stops 21, 22 are formed by two helical segment-shaped locking elements 41, 42, the diameter of which before fitting into the thread between the spindle nut 3 and the spindle 2 is greater than the diameter of the thread. The helical segment-shaped locking elements 41, 42 have a sectioned toroidal shape and are made from an elastic material, that is to say they can be compressed by an elastic deformation. In fitting the locking elements 41, 42 into the thread, the locking elements 41, 42 are compressed and due to the elastic deformation the locking elements 41, 42 are after fitting frictionally positioned in the spindle nut 3. The locking elements 41, 42 are therefore frictionally braced by their outer circumference against the spindle nut 3 and at the same time do not have any point of contact with the spindle 2, in order that the latter can continue to turn without friction losses. The right-hand locking element 42 in the drawing again serves as stop 21 for the first spring element 10. Any second spring element 20 provided is then arranged between the locking element 41, shown on the left-hand side of the drawing, and the rolling elements 4.

Figure 7:
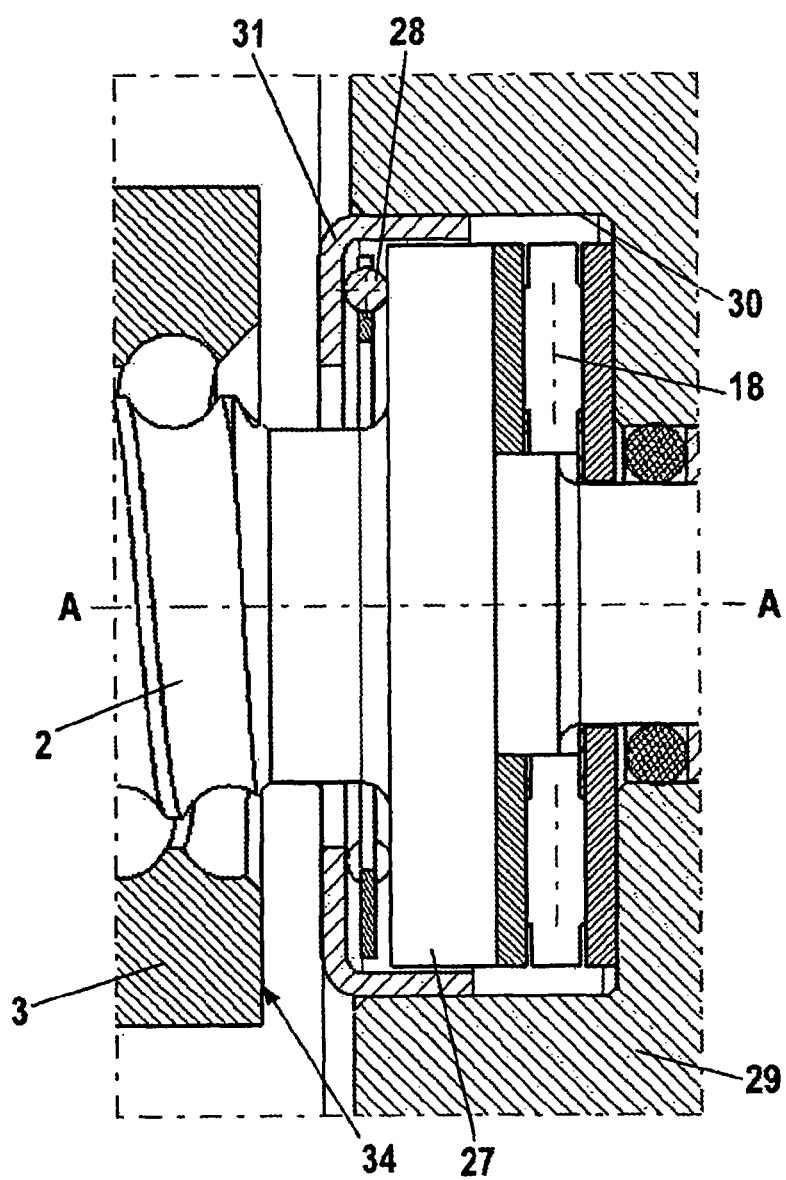
FIG. 7 shows a detail from FIG. 1.

FIG. 7 represents an enlarged detail from FIG. 1 and shows how the transmission 1 is integrated into the vehicle brake. The flange 27 of the screw spindle 2 is received by a stepped bore 30 in the brake housing 29 and is supported by way of a first axial bearing 18 on the brake housing 29. A second axial bearing 28 is arranged between the flange 27 of the screw spindle 2 and a canister 31 connected to the brake housing 29. This canister 31 comprising the second axial bearing 28 and pressed into the stepped bore 30 of the brake housing 29 has two functions. On the one hand a motion of the screw spindle 2 along the piston longitudinal axis A is suppressed, that is to say the spindle 2 cannot be drawn out of its position shown in FIG. 7, whilst on the other hand the arrangement serves as stop and as a safeguard to prevent the spindle nut 3 jamming, as will be explained in more detail below. As soon as the spindle nut 3 completes a return movement towards the flange 27 on the spindle 2 when the parking brake is released, the spindle nut 3 with its external face 34 will come into contact with the canister 31. In so doing the spindle 2 exerts an axial force on the second axial bearing 28. As has already been mentioned, however, the spindle 2 cannot be drawn out of the stepped bore 30. But at the same time no jamming can occur between the spindle nut 3 and the canister 31, since the moment of rolling resistance of the second axial bearing 28 is correspondingly small.

A time lapse diagram for application and release of the parking brake is represented in FIG. 8. The hydraulic pressure p introduced into the hydraulic operating pressure chamber 6 is represented by a dashed line whilst the application force F generated by means of the electromechanical actuator 7 and the transmission 1 is represented by a solid line. The hydraulic pressure p and the electromechanical application force F are accordingly plotted on the ordinate. At time $t_0$ no hydraulic pressure medium is being admitted into the operating pressure chamber 6 and the parking brake is in the unactuated state. At time $t_1$ the hydraulic pressure $p_1$ is admitted to the operating pressure chamber. The virtually simultaneously occurring application force $F_1$ corresponds to the no-load sliding of the balls 4 and the increase in the application force $\Delta F_{Rutsch}$ results from the hydraulic feed pressure. The actual electromechanical actuation commences at time $t_2$. Until time $t_3$ the rolling elements 4 roll until a parking brake application force $F_2$ is attained. The additional application force $\Delta F_{Roll}$ generated in the process is proportional to the rolling travel of the balls 4. The parking brake application force $F_2$ is therefore composed of the application force $\Delta F_{Rutsch}$ corresponding to the hydraulic feed pressure in the operating pressure chamber 6 and the superimposed electromechanical actuation $\Delta F_{Roll}$. Immediately on completion of the hydraulic pressure admission into the operating pressure chamber at time $t_4$, the hydraulic pressure is reduced to p=0 and the parking brake application force falls gently to the value $F_3$. The parking brake holds the motor vehicle under the brake application force $F_3$.

Releasing the parking brake at time $t_5$ constitutes an actuation of the transmission 1 under load and leads to rolling of the balls 4 and a reduction of the application force by a force $\Delta F_{Roll}$, which corresponds to the rolling of the balls 4. In the rolling, the spring element 4 will have been compressed and there is no further buffer travel available for further rolling of the rolling elements 4. In order to fully release the parking brake, it is necessary for the holding force to be reduced by a further amount $\Delta F_{Rutsch}$ corresponding to the sliding of the balls 4. Since this already occurs on a different force level, the balls 4 are able to slide. In the second embodiment according to FIG. 4 a compression of the second spring element 20 instead occurs accompanied by a further rolling of the balls 4. At time $t_6$ the brake application force F is reduced to zero and the motor vehicle can be moved unbraked.

FIG. 9 shows a diagram, in which the brake application force F is plotted on the ordinate and the resulting drive torque M of the transmission 1 on the abscissa. The curve with a solid line here describes the behavior of a transmission 1 having one or two spring elements 10, 20 in the absence of any hydraulic pressure admitted to the operating pressure chamber 6. The dotted line shows the behavior of a transmission 1 according to FIG. 3, which has only one spring element 10, when a hydraulic pressure is admitted into the operating pressure chamber 6 before application of the parking brake and a hydraulic pressure reduction before release of the parking brake, as has been described with reference to FIG. 8. It can be seen from this that on release of the parking brake a negative moment occurs, which is provided with the reference numeral 33. This negative moment 33 is generated on releasing of the parking brake due to sliding of the rolling elements 4, when these have already previously rolled, the spring element 10 has been compressed and no further buffer travel is available for further rolling of the rolling elements 4. This negative moment 33 occurs between times $t_5$ and $t_6$ in FIG. 8 and is prevented by the second spring element 20, as represented by the dashed line.

Figure 10A:
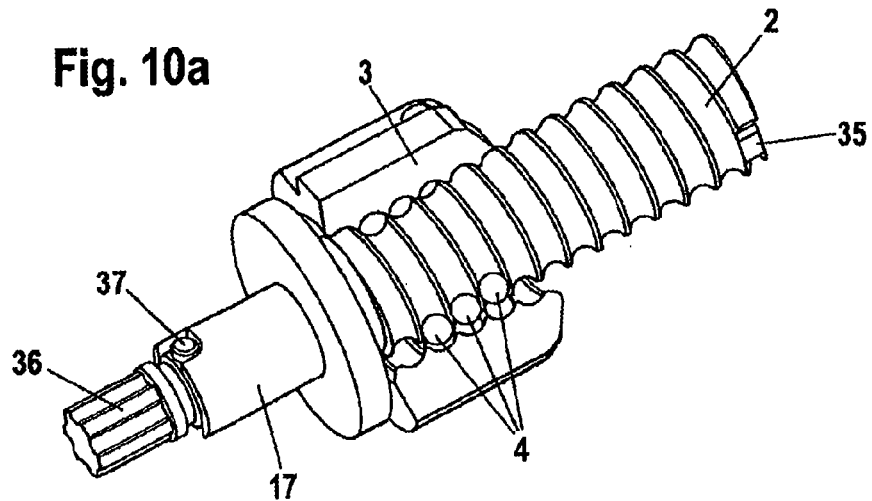
FIG. 10a, b show the transmission according to FIGS. 3 and 4 with integral mechanical energy storage device.
Figure 10B:
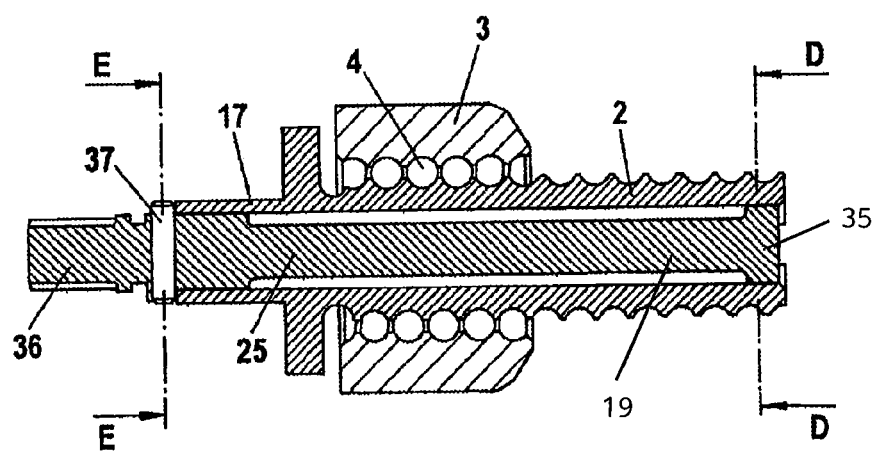

A further embodiment of the transmission 1 is represented in FIGS. 10a and 10b and comprises a mechanical energy storage device 19, which is loaded during actuation of the screw spindle 2. This mechanical energy storage device 19 is formed by a torsion bar 25, which is received by an axial bore in the screw spindle 2. The screw spindle 2 is therefore of hollow construction, in order to accommodate the torsion bar 25. The torsion bar 25 is positively connected or frictionally coupled to the screw spindle 2 at the end of the screw spindle 2 remote from the shaft. For this purpose the torsion bar 25 at this end comprises a transverse thickening 35, by means of which the torsion bar 25 is fixed by positive interlock in the spindle 2. The other end is equipped with a seat 36 for the input-side torque and by means of a pin 37 is connected by positive interlock to the shaft 17 of the spindle 2. The pin 37 at the same time serves to fix the preloaded torsion bar 25. In addition, the shape of the groove in the spindle 2 serves to provide a precisely defined torsional travel.

The cross sections D-D and E-E from FIG. 10b are represented in FIGS. 11a and 11b. FIG. 11a therefore here shows how the transverse thickening 35 of the torsion bar 25 is connected by positive interlock to the spindle 2. The precisely defined angle of rotation on the spindle 2 facilitates a very precise and reproducible adjustment of the torques. The cross section of the torsion bar 25 may be circular or rectangular, as required.

The torsion bar 25 is intended to maintain the set brake application force. The torsion bar 25 is here arranged in the torque flow and acts on the spindle 2. The torsion bar can be tensioned or loaded under a rotation of the spindle 2 and compensates for thermal shrinkage effects. This serves to ensure that the application force acting on the brake linings is virtually immune to thermally induced variations in length in the area of the brake caliper.

As is shown in FIG. 12, the spindle nut 3 of the transmission 1 is pressed into the brake piston 5 in such a way that a relative movement between the spindle nut 3 and the brake piston 5 generates a frictional force, which is indicated by the force arrow 38 in FIG. 12. In addition, the sealing ring 26 between the brake piston 5 and the brake housing 29, already mentioned in connection with FIG. 1, is embodied in such a way that under a relative movement between the brake piston 5 and the brake housing 29 a further frictional force is generated, which is represented by the force arrow 39. On actuation of the transmission 1 in order to obtain an application force, the spindle nut 3 is positively braced against the brake piston 5 and moves along the piston longitudinal axis towards the left of the drawing, until it comes into contact at the end face between the spindle nut and the brake piston. An application force is developed.

After reduction of the application force on releasing the brake, the spindle nut 3 is either drawn out of the brake piston 5 or the brake piston is drawn back into the brake housing 29, not shown here. In the process work is performed either in opposition to the frictional force between the spindle nut 3 and the brake piston 5, or in opposition to the frictional force of the sealing ring 26. This work in opposition to the frictional forces can be seen from the power consumption represented in FIG. 13. The power consumption represented in FIG. 13 first exhibits a minimum on releasing the parking brake, before the work in opposition to the frictional forces that has just been referred to leads to a renewed increase in the current, which is denoted by the reference numeral 40. This increase in current 40 is used as a current cut-off signal, which is to say the increase in current 40 is the signal to shut off the electromechanical actuator 7, since the parking brake is fully released.

Advantages of the present invention are the high overall efficiency of the transmission arrangement and the associated low electrical power consumption. A reduced running noise is achieved through the use of noise-optimized worm gears 11, 12 supported in rubber dampers, and the integration of a mechanical energy storage device obviates the need for any adjustment of the thermally stressed brake as it cools.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A combined vehicle brake, which comprises:
   a hydraulically actuated service brake and an electromechanically actuated parking brake device,
   a hydraulic operating pressure chamber in a brake housing defined by a brake piston, which for performing service braking actions is configured to be acted upon by hydraulic pressure fluid to actuate the brake piston along a piston longitudinal axis in order to produce a braking action,
   the parking brake device acting on the brake piston by means of a transmission, wherein the transmission translates a rotary motion of an electromechanical actuator into a translational motion and actuates the brake piston in order to perform parking brake actions and to keep the brake piston in an actuated position,
   the transmission comprising a screw spindle and a spindle nut, which are in contact with one another by way of multiple rolling elements, wherein the rolling elements are arranged to move between two stops in a thread of the spindle nut, and
   a spring element arranged between the rolling elements and one of the stops, said spring element allowing the rolling elements to slide in no-load actuation of the transmission and allowing the rolling elements to roll when the transmission is actuated under load,
   wherein the stops comprise two helical segment-shaped locking elements, the diameter of each helical segment-shaped locking element before pressing being greater than the diameter of the thread of the spindle nut and which after pressing are frictionally positioned in the spindle nut due to an elastic deformation.

2. The combined vehicle brake as claimed in claim 1, wherein a second spring element is provided, which is arranged between the rolling elements and the other stop.

3. The combined vehicle brake as claimed in claim 2, wherein the stops are frictionally coupled to the spindle nut or are integrally formed with the spindle nut.

4. The combined vehicle brake as claimed in claim 1 further comprising a mechanical energy storage device, which is loaded during actuation of the screw spindle.

5. The combined vehicle brake as claimed in claim 4, wherein the mechanical energy storage device comprises a torsion bar, which is received by an axial bore in the screw spindle and is positively connected or frictionally coupled to the screw spindle at an end of the screw spindle.

6. The combined vehicle brake as claimed in claim 5, wherein a cross section of the torsion bar is either circular or rectangular.

7. The combined vehicle brake as claimed in claim 1, wherein a flange of the screw spindle is received by a stepped bore in the brake housing and supported by a first axial bearing on the brake housing, whilst a second axial bearing is arranged between the flange of the screw spindle and a canister that is connected to the brake housing, and suppresses any axial movement of the screw spindle along a longitudinal axis of the brake piston.

8. The combined vehicle brake as claimed in claim 7, wherein the canister is pressed into the stepped bore in the brake housing.

9. The combined vehicle brake as claimed in claim 7, wherein the canister forms a stop for the spindle nut.

10. The combined vehicle brake as claimed in claim 1, wherein the spindle nut is fitted into the brake piston to generate a frictional force during relative movement between the spindle nut and the brake piston.

11. The combined vehicle brake as claimed in claim 1, wherein a sealing ring is provided between the brake piston and the brake housing and generates a frictional force in the event of a relative movement between the brake piston and the brake housing.

12. The combined vehicle brake as claimed in claim 1, wherein a two-stage reduction gear is interposed between the electromechanical actuator and the screw spindle, each stage of the two-stage reduction gear including a worm that meshes with a worm wheel, wherein one stage of the two-stage reduction gear is self-locking.

13. The combined vehicle brake as claimed in claim 12, wherein the worm of one stage of the two-stage reduction gear is integrated with the worm wheel of another stage of the two-stage reduction gear.

14. The combined vehicle brake as claimed in claim 12, wherein the worm of one stage of the two-stage reduction gear is connected to an output shaft of the electromechanical actuator.

15. The combined vehicle brake as claimed in claim 14, wherein the worm wheel of the other stage of the two-stage reduction gear is connected to the screw spindle.

16. The combined vehicle brake as claimed in claim 15, wherein said other stage of the two-stage reduction gear is the stage that is self-locking.

17. A combined vehicle brake, which comprises:
   a hydraulically actuated service brake and an electromechanically actuated parking brake device,
   a hydraulic operating pressure chamber in a brake housing defined by a brake piston, which for performing service braking actions is configured to be acted upon by hydraulic pressure fluid to actuate the brake piston along a piston longitudinal axis in order to produce a braking action,
   the parking brake device acting on the brake piston by means of a transmission, wherein the transmission translates a rotary motion of an electromechanical actuator into a translational motion and actuates the brake piston in order to perform parking brake actions and to keep the brake piston in an actuated position,
   the transmission comprising a screw spindle and a spindle nut, which are in contact with one another by way of multiple rolling elements, wherein the rolling elements are arranged to move between a first stop and a second stop in a thread of the spindle nut,
   a spring element arranged between the rolling elements and the first stop, said spring element allowing the rolling elements to slide in no-load actuation of the transmission and allowing the rolling elements to roll when the transmission is actuated under load, and wherein a flange of the screw spindle is received by a stepped bore in the brake housing and supported by a first axial bearing on the brake housing, whilst a second axial bearing is arranged between the flange of the screw spindle and a canister that is connected to the brake housing, and suppresses any axial movement of the screw spindle along a longitudinal axis of the brake piston, wherein the canister is pressed into the stepped bore in the brake housing, and wherein the canister forms the first stop of the spindle nut.

18. The combined vehicle brake as claimed in claim 17, wherein the second stop comprises a pin that is braced against the spindle nut.

19. The combined vehicle brake as claimed in claim 18, wherein the pin is pressed into a bore in the spindle nut and projects into the thread of the spindle nut.

* * * * *